Feb. 8, 1966 R. L. GLENN 3,233,755

BOTTOM UNLOADER FOR STORAGE STRUCTURES

Filed June 9, 1964 6 Sheets-Sheet 1

INVENTOR.
Richard L. Glenn
BY
Scofield, Kokjer, Scofield & Lowe
ATTORNEYS.

INVENTOR.
Richard L. Glenn
BY
Scofield, Kokjer, Scofield & Lowe
ATTORNEYS.

Feb. 8, 1966 R. L. GLENN 3,233,755

BOTTOM UNLOADER FOR STORAGE STRUCTURES

Filed June 9, 1964 6 Sheets-Sheet 3

INVENTOR.
Richard L. Glenn
BY
Scofield, Kokjer, Scofield & Lowe
ATTORNEYS.

Feb. 8, 1966 R. L. GLENN 3,233,755

BOTTOM UNLOADER FOR STORAGE STRUCTURES

Filed June 9, 1964 6 Sheets-Sheet 4

INVENTOR.
Richard L. Glenn

BY

Scofield, Kokjer, Scofield & Lowe
ATTORNEYS.

BOTTOM UNLOADER FOR STORAGE STRUCTURES

Filed June 9, 1964 6 Sheets-Sheet 5

INVENTOR.
Richard L. Glenn
BY
Scofield, Kokjer, Scofield & Lowe
ATTORNEYS.

Feb. 8, 1966 R. L. GLENN 3,233,755

BOTTOM UNLOADER FOR STORAGE STRUCTURES

Filed June 9, 1964 6 Sheets-Sheet 6

INVENTOR.
Richard L. Glenn
BY
Seefeld, Kokjer, Scofield & Lowe
ATTORNEYS.

3,233,755

BOTTOM UNLOADER FOR STORAGE STRUCTURES

Richard L. Glenn, Prairie Village, Kans., assignor to Butler Manufacturing Company, a corporation of Missouri Filed June 9, 1964, Ser. No. 373,706
13 Claims. (Cl. 214—17)

This invention relates generally to the controlled removal from a storage structure of non-free flowing materials and refers more particularly to an improved bottom unloading arrangement for storage bins which is uniquely adapted to provide effective unloading of such materials as ground ear corn and the like.

One of the principal objects of the invention is to provide a bottom unloading apparatus which permits uniform and controlled discharge of non-free flowing but particulate bulk materials from a storage structure as desired and which is capable of obtaining complete cleanout of the storage structure despite the lack of free flowability of the material. A closely related object of the invention in this respect is to provide apparatus of the character described which obtains effective unloading with a low required horsepower, thus making it economically feasible for farm and livestock feeding operations.

A further object of the invention is to provide an unloading apparatus which makes it possible to obtain discharge of a substantial portion of the material through induced gravity flow into the takeout sump despite the unfavorable flow characteristics of the material. We have found that by incorporating the features of our invention in even a horizontally floored storage structure, the operation of the takeout augers alone, that is, unaided by supplemental sweeping and undercutting of the material, results in removal of a sizeable portion of the material.

Still another object of the invention is to provide an unloading apparatus of the character and for the purposes described which provide both takeout and sweep augers and in which both may be selectively driven from a single power source such as an electric motor. In our invention, the operation of the takeout augers, the turning of the sweep auger about its own axis and the advancing of the sweep auger in the structure are all separate and fully controllable functions. Accordingly, the invention permits selective application of the limited horsepower available to a single specific function when needed. This flexibility of selection is one of the principal factors through which the low horsepower requirement referred to earlier is achieved.

Another object of the invention is to provide an unloading apparatus of the character described in which startup of the sweep auger can be accomplished with the limited horsepower available despite the tendency of the material to compact and pack about any object on the bottom of the storage structure during the filling thereof. A particular feature of the invention in this respect resides in the provision of means through which the sweep auger can be initially manually turned on its own axis working from the outside of the structure and which still permits subsequent sweep action around the structure.

Yet another object of the invention is to provide a positive sweep advance drive to the sweep auger which nonetheless limits the rate of sweep to that which can be handled within the power limits of the power source.

A further object of the invention is to provide a sweep auger support housing which contains the auger drive and yet in which the material load imposed on the support housing are transmitted therethrough to structural members rather than imposed on the drive train itself.

Other objects of the invention are to provide an unloading apparatus of the character described which utilizes simple drive components which, in the event of failure, could easily be replaced; which is so constructed that jamming of material in the takeout sump is avoided; which is readily adaptable to storage structures of different designs; and which is easy to operate.

Other and further objects of the invention, together with the features of novelty appurtenant thereto, will appear in the course of the following description.

In the accompanying drawings, which form a part of the specification and are to be read in conjunction therewith and in which, like reference numerals indicate like parts in the various views.

Figure 1:
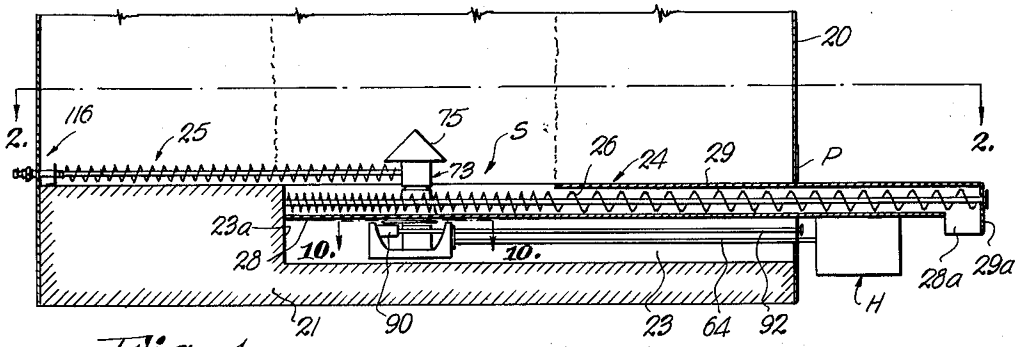
FIG. 1 is a somewhat schematic sectional view through the lower portion of a storage structure equipped with a preferred embodiment of the invention, the section being taken generally along the line 1—1 of FIG. 2 in the direction of the arrows.
Figure 2:
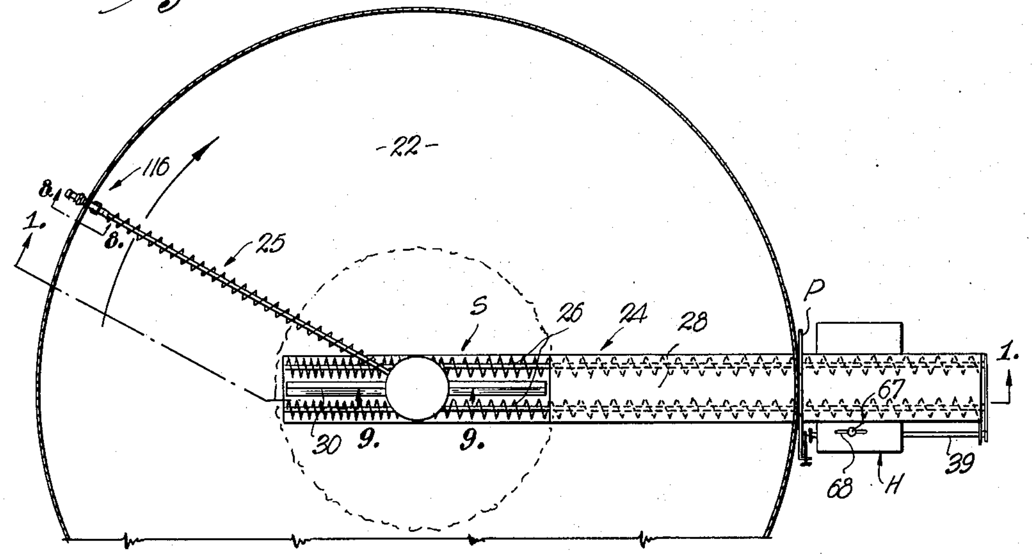
FIG. 2 is a fragmentary sectional view taken generally along the line 2—2 of FIG. 1 in the direction of the arrows.

Referring now to the drawings and initially to FIGS. 1 and 2, the instant invention is designed for use principally with storage structures having a circular wall 20. In the illustrated embodiment, the structure is provided with a poured concrete foundation 21 having the planar top surface 22 which forms the floor of the bin. A parallel sided recess 23 is formed in the foundation, the recess being formed essentially with its longitudinal center line on a diameter of the storage structure. The recess is of substantially greater length than the radius of the storage structure so that the inner end wall 23a of the recess is well on past the center. The recess is open at the outer end.

The unloading apparatus comprises in general a dual discharge or take-out auger assembly generally identified at 24 and a centrally pivoted sweep auger 25. The sweep auger extends substantially radially in the bin with its outer end located near, but, as will subsequently be seen, still spaced from the inside of the wall 20.

The discharge auger assembly comprises a pair of side-by-side auger units 26. The augers are carried in a box-like structure of rectangular cross section having the parallel side walls 27 which lie adjacent the sides of the recess and a bottom wall 28 which is spaced above the bottom of the recess. A top closure plate 29 flush with the floor surface 22 of the bin serves to cover the augers over a substantial portion of their length. It will be noted that the box-like casing proceeds well to the outside of the bin and that an opening 28a is provided in the bottom wall 28 adjacent the outer end wall 29a to permit discharge of materials drawn from the bin. It will be noted however that in the central portion of the storage structure the top closure plate of the casing is eliminated so as to provide an elongate rectangular open sump S in which the auger flights are exposed to the interior of the bin. This sump is symmetrical with respect to the center of the bin and of substantially greater length than width. For reasons subsequently to be set forth, the length of the sump in the case of ground ear corn should be approximately one-third the overall diameter of the bin and the width of the sump between one-fifth and one-sixth of the length of the sump. As a specific example, for a twenty-four foot diameter bin, the sump is provided with a length of eight feet and a width of eighteen inches.

The twin augers are continuous units having their opposite ends journaled in suitable bearings at the opposite ends of the auger casing. They are identical in construction. In the sump itself, they are separated by a splitter structure 30 of inverted V-shape (FIGS. 15 and 16) which is supported on the bottom wall of the casing. As will subsequently be seen, the longitudinal mid-point of the splitter structure coincides with the support pedestal 31 for the sweep auger 25 and housing 31 is shaped to form a part of and cooperate with the splitter structure in assisting in moving material thereby.

Figure 15:
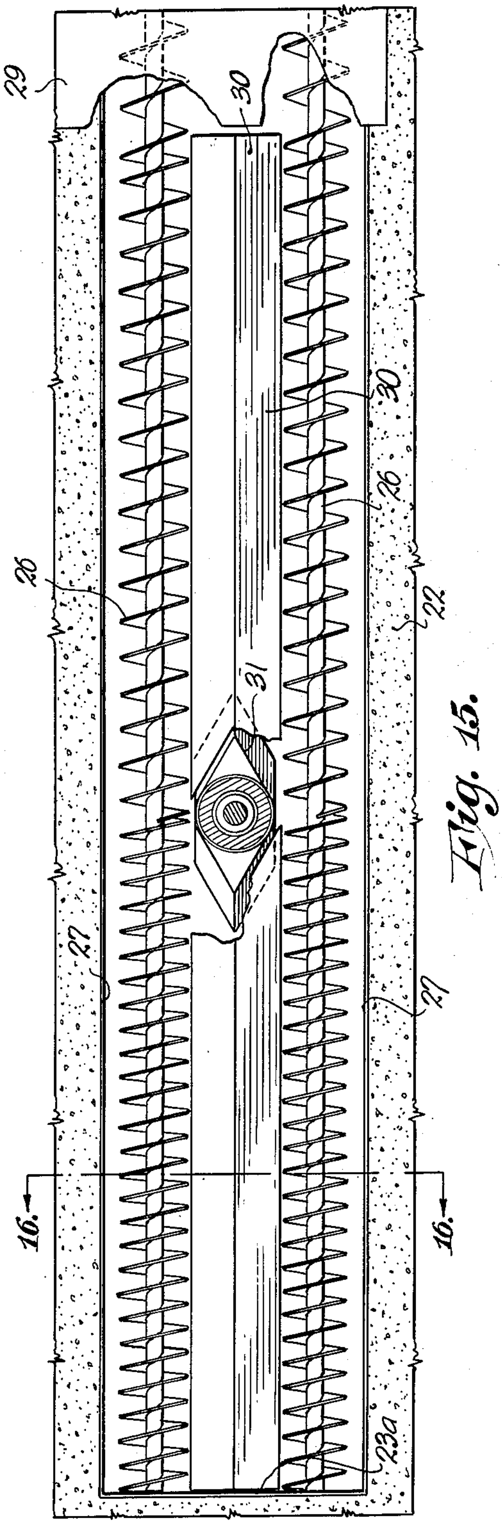
FIG. 15 is an enlarged fragmentary sectional view in the vicinity of the discharge sump, the view being taken along a line in the location of line 15—15 of FIG. 9 in the direction of the arrows.
Figure 16:
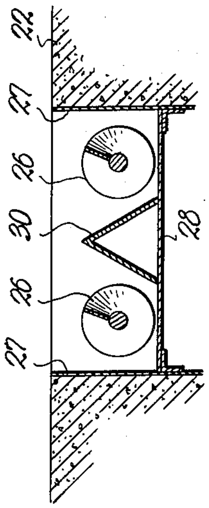
FIG. 16 is a sectional view taken along the line 16—16 of FIG. 15 in the direction of the arrows.

It is important to note that the discharge augers 26 are so constructed that the pitch of the flighting thereof changes at certain critical points. Referring to FIG. 15, the pitch of the section of each auger proceeding from the inner end 23a to the bin center is one-half the pitch of the flighting which is shielded by the closure 24, while on the other side of the center up to the edge of the floor plate or closure, it is three-fourths of the latter. In other words, the pitch increases at two points, namely, the center of the bin and again at the entrance to the closed portion of the auger casing.

Figure 3:
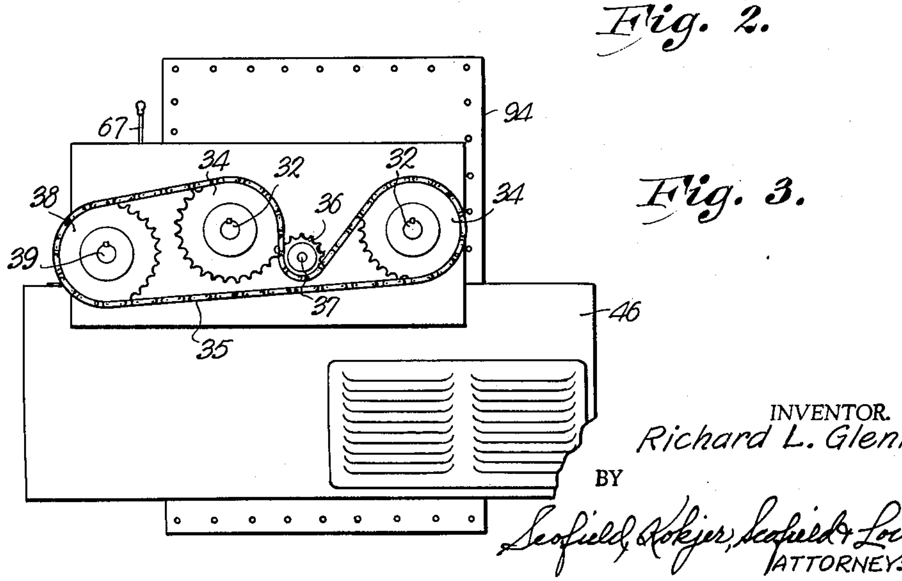
FIG. 3 is an enlarged end elevational view of the unloading device itself, being taken from the right-hand side of FIG. 1, the bin wall not shown.
Figure 4:
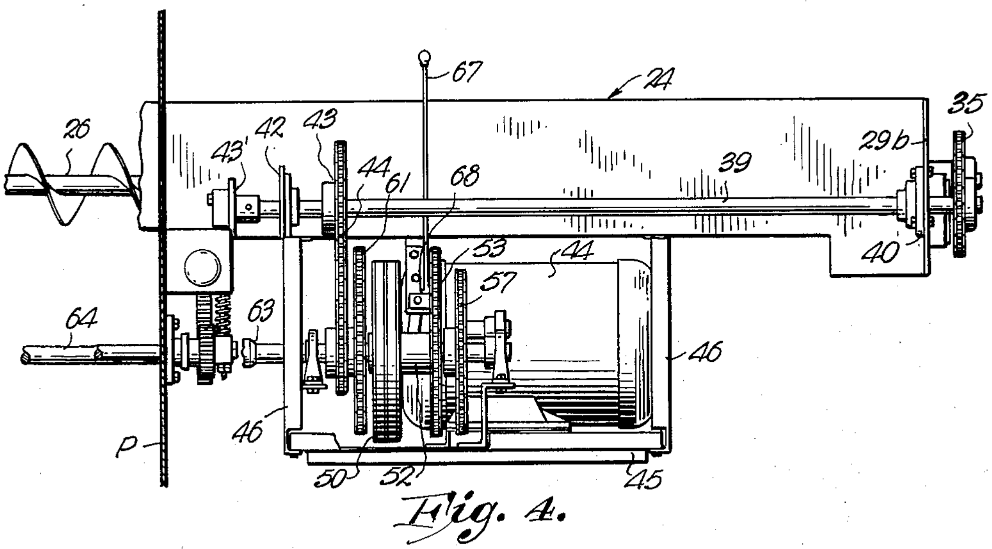
FIG. 4 is an enlarged fragmentary side elevational view, the lower casing wall removed to expose the transmission and drive mechanism.

The discharge augers 26 are driven by a drive system best understood by referring to FIGS. 2, 3 and 4. As earlier mentioned, the augers extend well past the side wall of the bin. At their outer ends they have the shaft extensions 32 which are journaled in like bearings 33 secured to the end 29a of the discharge auger casing. Attached respectively to these extensions outside the casing are sprockets 34. A drive chain 35 engages the latter, being bent to the respective sprockets by an idler sprocket 36 journaled on a stub axle 37 supported from the end wall of the casing.

Figure 5:
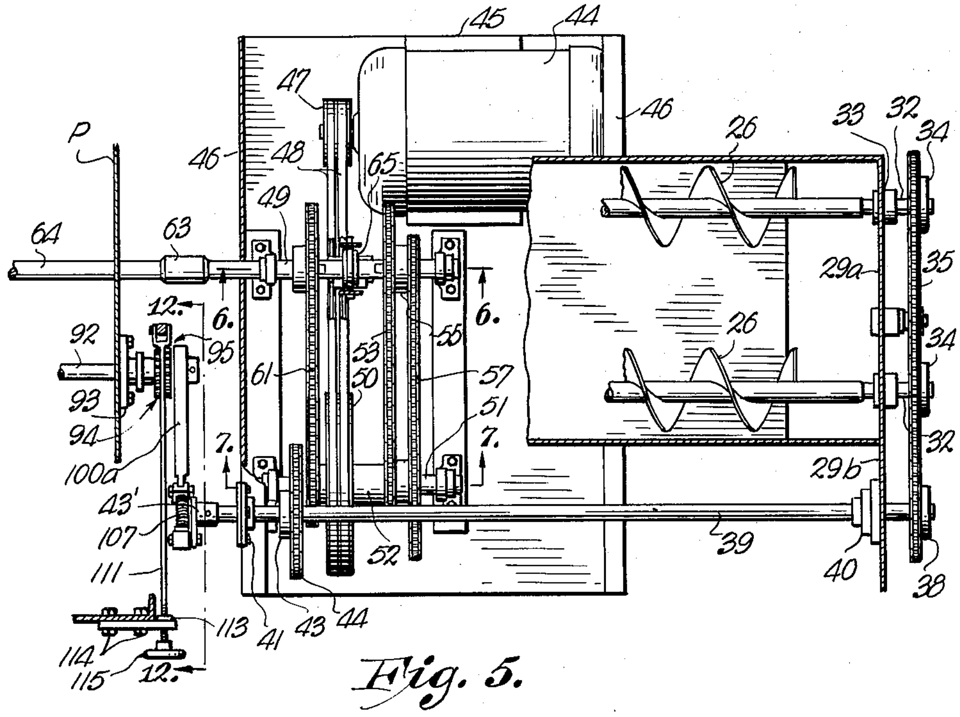
FIG. 5 is a fragmentary top plan view of the arrangement of FIG. 4, part of the twin auger assembly shown in section and part broken away along with other elements for the purpose of illustration.

The drive chain 35 is trained around another sprocket 38 which is keyed to an elongate shaft 39 proceeding back toward the bin along the side of the auger casing. The shaft 39 is journaled near its outer end in a bearing 40 secured to an extension 29b proceeding laterally from the end of the auger casing and near the other end in a second bearing 41 which is supported from a vertical support plate 42. Power is supplied to shaft 39 through a sprocket 43 and chain 44, the latter being connected with a drive and transmission mechanism later to be described. It will be noted that shaft 39 extends on beyond plate 42 (FIGS. 4 and 5) and that secured to its outer end is a crank arm 43' (see FIG. 12).

Turning now to the details of the power and transmission system, and referring to FIGS. 4, 5, 6, 7 and 11 in particular, a motor 44 is supported on a suspension platform 45 hung below the auger casing by hanger members 46 at the front and rear thereof. The hanger members form with conventional side panels (not shown) a housing H for enclosing the power and transmission system. The motor is preferably a single phase repulsion induction motor. Located on its output shaft is a double sheave 47 engaging twin belts 48. The upper and lower flights of these belts pass respectively above and below a shaft 49 and proceed outwardly to connect with an enlarged double sheave 50 which is supported on a second shaft 51. The shafts 49 and 51 are respectively journaled in suitable bearings carried by brackets supported on the hangers and motor platform.

The double sheave 50 is carried on a sleeve 52 which is rotatable relative to shaft 51. The sleeve, which includes the necessary bearings between it and the shaft to provide a free running connection, has secured thereto the reducd diameter sprocket 52a. A chain 53 interconnects this sprocket with a large diameter sprocket 54 supported on shaft 49. The sprocket 54 is formed as part of a sleeve assembly 55 which includes not only the sprocket 54 but also smaller diameter sprocket 56. The sleeve assembly 55 with its connected sprockets is freely rotatable on shaft 49. From sprocket 56 there runs a chain 57 which drivingly engages another large sprocket 58 which is keyed to shaft 51.

From the foregoing it will be seen that the drive to shaft 51 is achieved through a reduction drive train which proceeds from the motor sheave 47 to the large sheave 50, thence by means of chain 53 to the sleeve assembly 55, and then back again through chain 57 to the sprocket 58 keyed to the shaft 51.

Mounted on shaft 51 on the opposite side of the double sheave 50 from the sprocket 58 are two additional sprockets 59 and 60. These are both keyed to the shaft to turn therewith. The sprocket 59 engages with a chain 61 which leads back to a larger diameter sprocket 62 freely rotatable relative to and on shaft 49. The other sprocket 60 drives a chain 44 which leads upwardly and drivingly engages the sprocket 43 on the earlier described shaft 39 which is directly connected to the discharge augers.

The shaft 49 on which is located the two spaced floating sprockets 54 and 62 leads into the storage structure and is coupled by coupling 63 to a long horizontal shaft 64. As will subsequently be seen, shaft 64 serves to provide the driving connection with the gear train which operates to turn the sweep auger 25 on its own axis. The two sprockets 54 and 62, along with the clutch mechanism now to be described, provide a means of permitting the sweep auger to remain idle or of selectively driving it at two different speeds.

Figure 11:
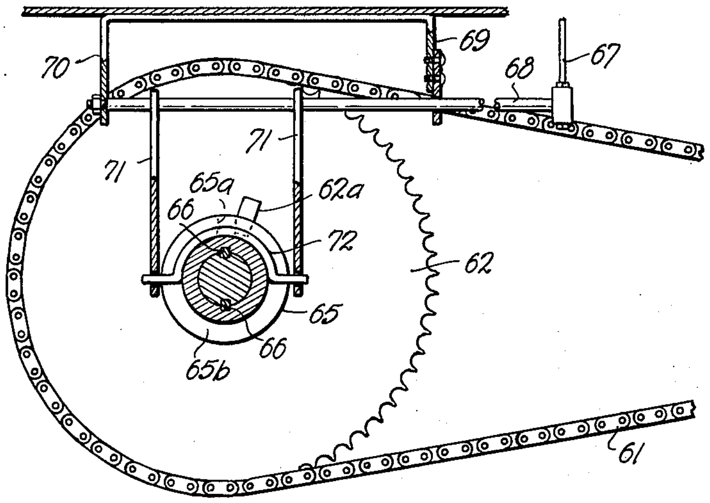
FIG. 11 is an enlarged fragmentary sectional view taken generally along the line 11—11 of FIG. 6 in the direction of the arrows.

The main element of the clutch mechanism comprises a ring element 65 which is slideable longitudinally on shaft 49 between sprockets 54 and 62 but is keyed to turn therewith by means of a spline connection which includes keys 66 secured to the shaft and which engage in corresponding grooves in the ring (FIG. 11). The opposite ends of the ring 65 are provided with radial ears 65a, each of which is adapted upon selective displacement of the ring toward the respective sprockets 54 or 62 to interengage with lugs 54a, 62a projecting respectively from and secured to the confronting faces of the sprockets.

Figure 6:
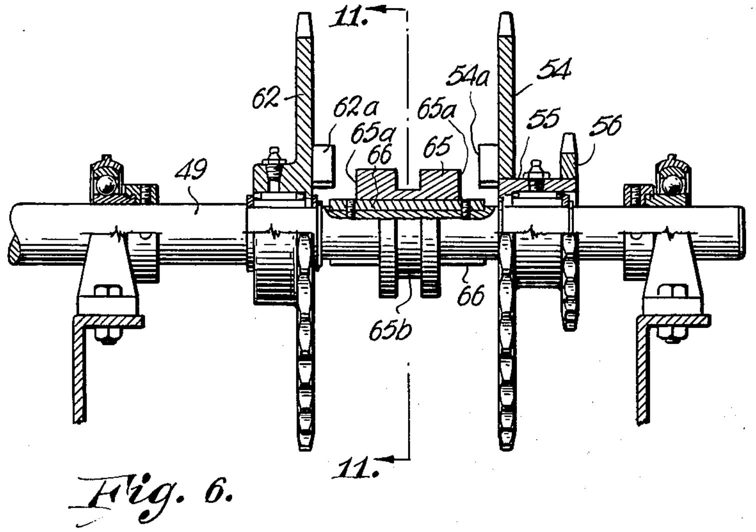
FIG. 6 is an enlarged partly sectional view taken generally along the line 6—6 of FIG. 5 in the direction of the arrows.
Figure 7:
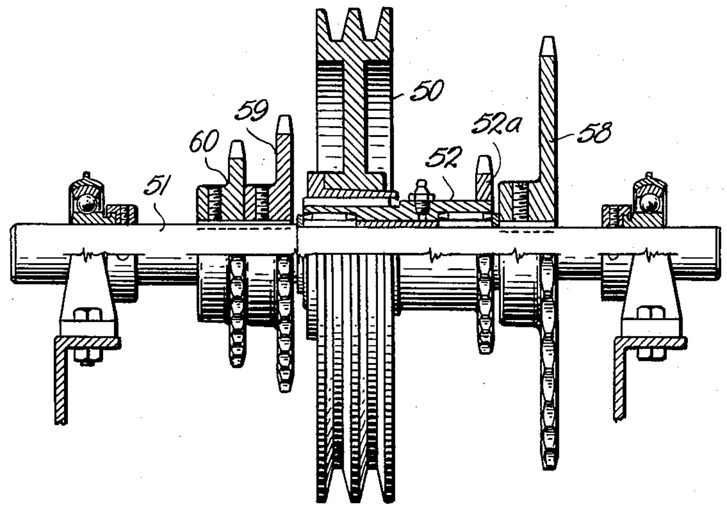
FIG. 7 is an enlarged partly sectional view taken generally along the line 7—7 of FIG. 5 in the direction of the arrows.

When in the neutral position, which is the position illustrated in FIG. 6, the sprockets 54, 62 are capable of turning freely on shaft 49. Obviously, when either lug 54*a* or 62*a* is engaged by the corresponding radial ear on the clutch ring, the sprocket to which the lug is secured is keyed to shaft 49 and the shaft will turn with and at the same rate as the sprocket. Due to the additional speed reduction step involved between the shaft 51 and sprocket 62, the latter will turn at a slower rate than sprocket 54.

The displacement of clutch sleeve 65, necessary to move it between the two driving positions, is obtained by means of an upright clutch lever 67 which has its lower end secured to a sprocket shaft 68. As seen in FIG. 11, this shaft is supported by a pair of hanger straps 69, 70 which depend from the bottom of the discharge auger casing. A pair of spaced arms 71 are welded or otherwise secured to shaft 68 and extend downwardly to lie on opposite sides of the clutch ring 65. The arms 71 are connected at their lower ends with the outturned opposite ends of the yoke member 72. The central arch portion of the yoke member 72 is received in a circumferential groove 65*b* formed centrally in the clutch ring.

The clutch ring 65 is, as earlier mentioned, shown in the neutral position in FIGS. 4–7 and 11. Shifting the clutch lever 67 to the left or counterclockwise as viewed in FIG. 5 serves to drivingly connect shaft 49 with the sprocket 54. Clockwise movement of the lever causes connection with the sprocket 62.

Figure 9:
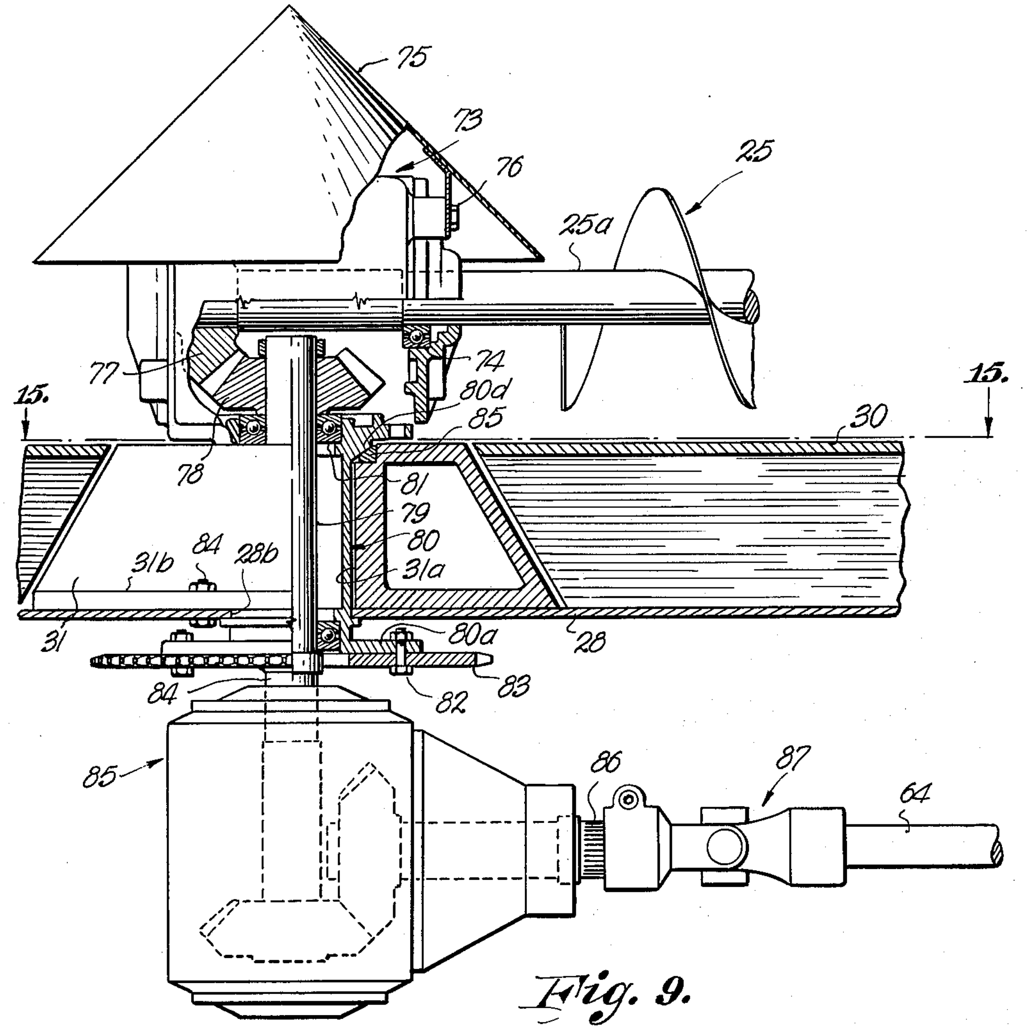
FIG. 9 is an enlarged fragmentary sectional view taken generally along the line 9—9 of FIG. 2 in the direction of the arrows, the sweep auger being advanced approximately 80° from the FIG. 2 position so it is parallel with the discharge augers.

As earlier noted, the shaft 64 is of considerable length, proceeding inwardly into the recess 23 toward the center of the bin. At its inner end, it connects with the input to the sweep auger drive gear train and mechanism detailed in FIG. 9 and now to be described.

The sweep auger shaft 25*a* extends horizontally from inside an essentially rectangular housing 73 and is journaled therein by appropriate bearings as at 74. An inverted cone-like shield 75 is mounted on top of the housing in any convenient manner, as by a plurality of internally disposed peripherally spaced brackets and bolts as shown at 76. Inside the housing the auger shaft has keyed thereto a bevel gear 77. A second bevel gear 78 meshes with gear 77 and is carried at the upper end of a vertical shaft 79 which extends into the housing from the lower side thereof. Shaft 79 is encased within a hub or extension 80 depending below the housing and either formed integral therewith or firmly attached thereto. A bearing 81 is provided for stabilizing the shaft 79 in the housing. The hub extends downwardly through an aperture 28*b* in the bottom wall of the sump 28. A circumferential flange 80*a* is provided on the lower end of the hub, and secured to the under side of the flange by bolts 82 is a sprocket 83.

Surrounding the hub 80 and seated on the bottom wall of the sump is the generally pyramidically shaped pedestal 31 to which brief reference has earlier been made. The pedestal is tapered fore and aft to provide support for the adjacent ends of the splitter sections 30 (see FIG. 12) and may be of hollow cast construction. Centrally it is provided with the cylindrical pasasgeway 31*a* in which the hub 80 is rotatably received. A bolting flange 31*b* is provided on the lower edge of the pedestal to provide means through which bolts 84 can be utilized to secure the pedestal to the floor 28 of the sump.

It will be noted particularly that the upper end of the pedestal is counter bored to provide an annular shoulder or seat for a brass or bronze bearing ring 85. The upper end of the hub 80 is flared outwardly as at 80*d* to provide a matching annular conical face which seats upon the bearing ring. As a result, the weight of the upper housing 73 and the load imposed on the housing and shield 75 by materials stored in the bin is taken up and resisted in the pedestal 31 and not in the drive mechanism itself. This is a very important feature of our invention as it assists greatly in obtaining satisfactory operation with low required horsepower and additionally promotes long life for the mechanism.

The lower end of the vertical power shaft 79 is connected with the output shaft 84 of a simple right angle gear box 85 having the input shaft 86. Connected with the input shaft 86 is the main shaft 64 from the outside power source, the connection being made by means of the universal joint 87.

Figure 10:
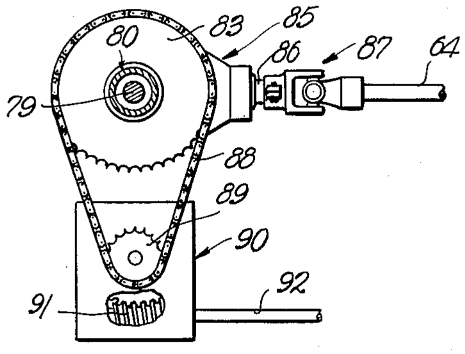
FIG. 10 is a somewhat schematic fragmentary sectional view taken generally along the line 10—10 of FIG. 1 in the direction of the arrows.

The power and transmission system for advancing the sweep auger 25 around the bin will now be described. As noted a few paragraphs above, the lower end of the hub 80 has secured thereto the sprocket 83. As seen in FIGS. 1 and 10, a drive chain 88 runs from that sprocket to the small sprocket 89 on a gear box 90 having a worm type drive. The worm 91 is connected with an elongate shaft 92 running back out of the recess 23 and journaled in bearing 93 on the wall mounting plate 94 which forms a part of the overall unit and operates to close the end opening of the recess 23.

Figure 12:
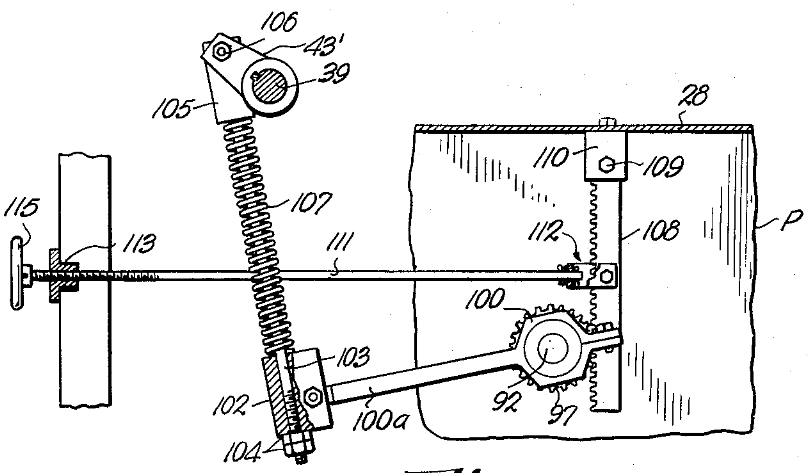
FIG. 12 is an enlarged fragmentary sectional view taken along the line 12—12 of FIG. 5 in the direction of the arrows.
Figure 13:
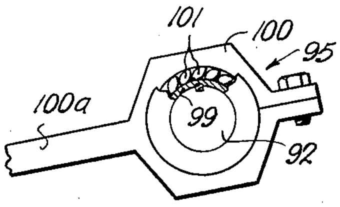
FIGS. 13 and 14 are respectively schematic detail showings of certain aspects of the auger advancing mechanism.
Figure 14:
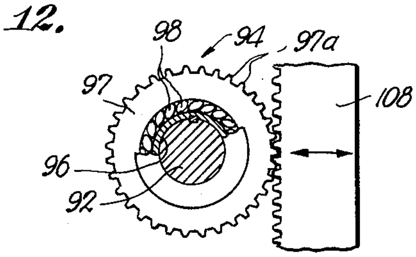

The outer end of shaft 92 has mounted thereon in end-to-end arrangement a pair of one-way clutch assemblies 94 and 95, the details of which are best seen in FIGS. 12, 13 and 14. The clutch assembly (see FIG. 14) contains the inner member 96 which is keyed to shaft 92 and the outer member 97 which has formed on its outer periphery the gear teeth 97*a*. Wedging cams 98 are located in the annular space between the inner and outer members, these permitting rotation of the inner member relative to the outer member in the counterclockwise direction only. The clutch assembly 95 has the inner member 99 and outer member 100 between which are located similar one-way wedging cams 101. The inner member 99 is keyed to the shaft. The outer member has the radial arm portion 100*a* which has pivotally mounted on its outer end the sleeve member 102.

The sleeve 102 has a passageway therethrough into and through which extends a rod 103. The rod is received in the passageway in a slideable fit and is threaded at its lower end to receive the retainer nuts 104. The upper end of the rod has the head portion 105 which is pivotally connected as at 106 with the crank arm 43′ keyed to the jack shaft 39 earlier described. A compression spring 107 encircles the rod 103 between the head 105 and the sleeve and provides a resiliently yieldable thrust connection between the crank 43′ and the arm 100*a*.

It will be observed that located adjacent the toothed outer member 97 of the clutch assembly 95 is a rack-like member 108. This element pivotally depends from bolt 109 which in turn is carried by a suitable bracket 110 secured to the underside 28 of the auger box. While shown with its teeth in engagement with the teeth of clutch member 97, the rack can be swung to a non-engaged position by longitudinal movement of the push rod 111 connected therewith. The push rod is rotatable on its own axis, being connected with the rack member by a bracket 112 having a flange transverse to the axis of the rod. The rod extends through an appropriate opening in the flange and retainers in the form of cotter pins are used to prevent longitudinal movement of the rod relative to the bracket. Near its outer end, the push rod is threaded and is received in a similarly threaded bushing 113 secured to any convenient support as by bolts 114 (see FIG. 5). A hand knob 115 is secured to the outer end of the rod. Obviously, movement of the rack member 108 out of and back into engagement with the teeth 97*a* of the clutch member 97 can be obtained as desired by turning the rod one way or the other. The purpose of this arrangement will be described in connection with the description of the operation of the unloader.

Figure 8:
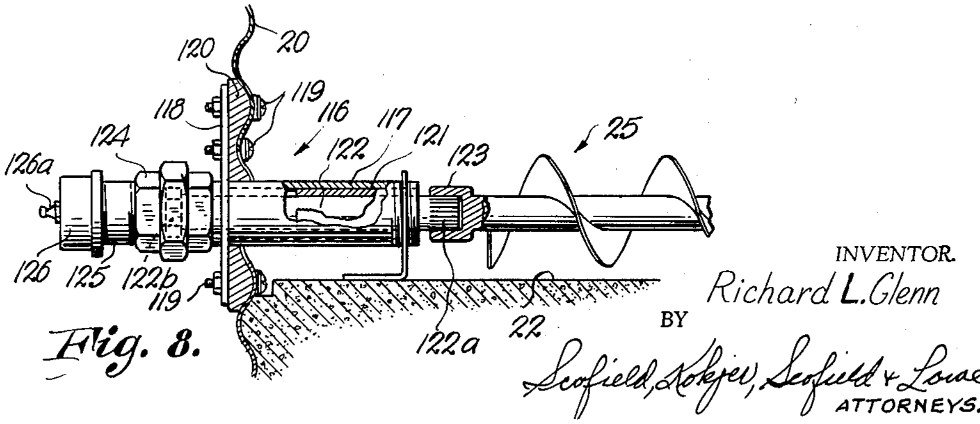
FIG. 8 is a greatly enlarged fragmentary sectional view taken along the line 8—8 of FIG. 2 in the direction of the arrows.

Returning now to the inside of the storage structure and referring again to the sweep auger 25, it will be seen from FIGS. 1, 2 and 8 that the outer end of the sweep auger is adapted to be connected with a support assembly 116 providing driving access to the auger from the outside of the bin. The main element in the end support assembly for the auger is a tubular sleeve 117 which extends through the side wall into the bin near the floor. A plate 118 is secured to the sleeve and is bolted to the bin by bolts 119. A spacer 120 is interposed between the plate 118 and the bin wall, the spacer conforming in shape with the bin wall on that side facing the bin. That end of the sleeve 117 located inside the bin is supported on a bracket resting on the bin floor and connected with the sleeve.

A bushing 121 is located inside the sleeve and extending through the bushing in a rotatable and slidable fit is a shaft 122 having the intersplined end 122*a*. It will be noted that the shaft projects well beyond the end of the sleeve so that the spline is outside the sleeve. The splined end is received in a similarly splined socket 123 formed in the end of the auger shaft.

The outer end of shaft 122 is provided with a hex head 122*b*. This head is located within a union 124 threaded onto the outer end of the sleeve. A short coupling 125 is threaded onto the other end of the union and this has threaded on its other end the cap 126 carrying the grease fitting 126*a*.

It is important to note that the elevation of the sleeve 117 above the floor of the bin is sufficient that when the splined shaft 122 is engaged with the auger, it supports the end of the auger sufficiently above the floor that the auger flighting all along the length of the auger, or at least over a major portion thereof, is free from contact with the floor.

*Operation*

In utilizing a bin equipped with our unloader arrangement, the bin is filled in conventional fashion, usually from above. Prior to the start of filling, the rack member 108 is disengaged from the teeth of clutch member 97 and the clutch ring 65 is positioned in the neutral position between the drive sprockets 54 and 62 on shaft 49. Also, prior to filling, the sweep auger 25 is positioned with its outer end adjacent and connected with the splined shaft 122 of the end support assembly 116 as illustrated in FIG. 8.

As filling proceeds and as the level of material rises in the bin, it is advisable from time to time to turn the sweep auger 25 on its axis in order to prevent packing of the material therearound. To do this, the motor 44 is started and clutch ring 65 is engaged with one of the sprockets 54 or 62, preferably the latter as it is the low speed sprocket. Shifting of the clutch ring 65 is accomplished through pivotal movement of clutch lever 67. While starting of the motor also results in starting of the take-out augers, the extent of material movement by the augers is limited for the short interval of operation required to clear the sweep auger.

Once filled, the storage structure is left alone until such time as removal of a quantity of material therefrom is desired. Ordinarily, during inoperative periods, the discharge opening 28*a* will be sealed shut by any suitable closure (not shown) such as a plate bolted or clamped around its edges to the opening. When material removal is to be commenced, the closure is removed.

To start the unloading of a filled bin, the clutch ring 65 is again put in neutral if it is not already there. The motor is thereupon started which starts rotation of the twin take-out augers 26, the drive train being from motor 44 through belts 48 to shaft 51, from the latter right chain 44 to shaft 39 and from shaft 39 by chain 35 to the sprockets on the outer end of the take-out augers. The augers will thus be driven in a direction to progressively remove material from the rectangular sump S out through the casing to and through the discharge opening 28*a*.

We have found that even in a cohesive material like ground ear corn, by providing a rectangular sump of the character described, in many cases the material will flow into the sump by gravity from the bin as necessary to replace that removed by the augers and accordingly that it is not necessary immediately to start up the sweep auger 25. We have actually observed that a substantially cylindrical central core is removed from the mass of material as unloading progresses, the core leaving a corresponding cylindrical opening in the material as indicated in broken lines at C in FIGS. 1 and 2. This opening has a diameter substantially equal to the diagonal dimensions of the sump.

When the condition is reached that insufficient material is being delivered to the twin take-out augers by gravity alone, which may be due to temporary bridging in the material mass, or the complete removal of all material from the center portion of the bin in the area defined by the core wall C, the sweep auger 25 can be brought into play. This is accomplished by shifting clutch ring 65 through manipulation of clutch lever 67 to a position wherein the lug 65*a* on the clutch ring lies in the path of lug 62*a* on the low speed sprocket 62. As earlier seen, this results in driving engagement between the sprocket and the shaft 49 and since the latter is coupled with shaft 64 through coupling 63, shaft 64 will begin to rotate. The drive to the sweep auger 25 is thus completed from shaft 64 through gear boxes 85 and 73.

It is important to note once again and somewhat parenthetically at this point, that by virtue of the construction of the pedestal 31 and the manner of support of the upper gear box 73 thereon, any material loads imposed on the shroud 75 on top of the sweep auger housing are carried by the pedestal and not transferred to the drive gears or shafts. Accordingly, the frictional resistance in the gear train is held to a minimum and the starting torque is thereby materially reduced.

If a bridge has been maintained around and over the sweep auger during filling, as earlier suggested, starting of rotation of the sweep auger on its own axis should be a simple matter. Since the auger flighting is elevated above the floor due to the connection of the auger with the end support assembly 116, the floor friction is eliminated, thus further reducing the start up torque. However, if by any chance the sweep auger is jammed in the material to the point where the motor does not have sufficient power to start it, then a manual turning force can be applied to break the jam.

Referring to FIG. 8, in order to manually turn the auger on its shaft, the union 124 with its attached cap 126 is unthreaded from the outer end of sleeve 117, thus exposing the head 122*b* of the shaft 122. A wrench or other appropriate tool can be connected with the head and utilized to turn the shaft. The splined connection between shaft 122 and the auger shaft socket 123 produces turning of the auger 25 on its own axis responsive to turning of the shaft.

When the sweep auger is freely turnable, shaft 122 is withdrawn, thus freeing it for sweeping movement around the bin. In order to impose a sweep force on the auger, it is necessary to engage the sweep drive.

To engage the sweep drive, hand wheel 115 on rod 111 is turned until the rack member 108 (FIG. 12) is brought into engagement with the teeth 97*a* of the clutch member 97 or into the position of FIGS. 12 and 14. Prior to this time shaft 39 has been imparting through crank 43′, spring 107 and rod 103, an oscillating motion to clutch member 100. Each counterclockwise stroke of the clutch member (as viewed in FIGS. 12 and 13) has resulted in a corresponding incremental turn of shaft 92 since the wedging cams 101 affected by clutch member 100 engage the inner clutch member 99 on the counterclockwise stroke. However, on the clockwise stroke, the shaft is permitted to move back to the original position since the toothed outer clutch member 97 of the adjacent clutch assembly 94 is free to turn and there is nothing holding the shaft against the return movement.

However, when the rack member is engaged with the toothed clutch member 97, each counterclockwise stroke of the clutch member 100 produces an incremental counterclockwise turning of the shaft since each advance of the shaft is retained by operation of the clutch assembly 94. Since the toothed outer member 97 is held against movement, the shaft cannot turn back clockwise inside that clutch member. The wedge cams 98 of clutch assembly 94 permit the counterclockwise turning but resist clockwise turning. Thus, the oscillating clutch member 100 serves to produce stepwise rotation of shaft 92. Since the shaft 92 is drivingly connected with the sweep auger housing 73 by gear box 90, chain 88 and sprocket 83, rotation of the shaft 92 is converted into a force urging the auger to sweep about the bin.

The rate of advance of the sweep auger is controlled by and responsive to the resistance imposed against sweep movement by the material. If the resistance to movement is greater than the compressive resistance of spring 107, the spring will deflect and permit rod 103 to reciprocate within sleeve 102. Accordingly, the sweep drive to the auger is such than the auger is always maintained snugged up against the material. In other words, the one-way clutch assemblies 94 and 95 coupled with the lost motion connection between the crank 43′ and the arm **100*a* permit the sweep auger to advance at a variable rate which depends upon the character of the material, the rate of advance ranging from the maximum when spring 107** suffers no deflection to zero when the spring suffers maximum deflection.

The speed of rotation of the sweep auger on its own axis can be increased when desired by shifting the clutch ring 65 into engagement with the high speed sprocket 54. This is usually done in the later stages of unloading when there is no supply to the sump other than what is drawn into the sump by the sweep auger.

It will thus be seen that we have provided an arrangement which attains all of the ends and objectives of the invention hereinbefore set forth. The take-out augers 26 can be operated alone or with the addition of the sweep auger. The sweep auger advance rate is self adjusting so as to hold the power requirements to what the motor will supply. The sweep auger can be operated intermittently in order to break bridges occurring in the material or can be operated on a continuous basis once gravity flow has completely discontinued or is not sufficient to produce the desired discharge rate. Only a single motor is required to operate the unloader, yet despite the presence of only one motor, great flexibility in operation is achieved. The unit is capable of handling non-free flowing materials with ease and facility because of the various protective features provided with low horse power requirements.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A bottom unloader apparatus for a circular storage structure having a floor, said apparatus comprising a trough recessed in said floor and extending diametrically thereof, the length of the trough being substantially greater than the radius of the storage structure, a partial cover for the trough, substantially flush with the floor and proceeding inwardly from the periphery of the floor toward the center thereof, said cover defining with the upper edges of the sides and inner end of said trough an elongate opening having its longitudinal mid-point substantially at the center of said storage structure, a pair of parallel discharge augers located within and extending substantially the full length of said trough, a pedestal member extending upwardly from the bottom of the trough at the center of the storage structure and between said discharge augers, and a sweep auger pivoted at one of its ends to said pedestal and extending radially outwardly therefrom above the plane of the floor.

2. A bottom unloader apparatus as in claim 1 including power means for driving said discharge augers, and selectively engageable and disengageable transmission means for connecting said sweep auger with said power means.

3. A bottom unloader apparatus as in claim 1 including detachable means for holding the outer end of said sweep auger in a stationary position relative the pedestal while permitting rotation of the sweep auger about its own auger axis.

4. A bottom unloader apparatus as in claim 3 wherein said detachable means comprises a sleeve supported adjacent the wall of the storage structure and a shaft extending rotatably through said sleeve and having a splined end received in a correspondingly splined socket in the outer end of said sweep auger.

5. A bottom unloader apparatus as in claim 1 wherein said pedestal is provided with a central vertical opening therethrough, said sweep auger includes at its inner end a drive housing resting upon and swivelly supported by said pedestal, and including a vertical drive shaft to said housing extending upwardly through said opening from below the bottom of the trough.

6. A bottom unloader apparatus as in claim 5 wherein said drive housing has a member connected therewith extending downwardly through said opening, and means for applying a torque on said last named member tending to turn said member and the housing about a vertical axis.

7. A bottom unloader apparatus as in claim 1 wherein the auger pitch on said discharge augers is greater on that side of the pedestal toward the discharge end of the trough than on the other side.

8. A bottom unloader apparatus for a circular storage structure having a floor, said apparatus comprising a trough recessed in said floor and extending diametrically thereof, the length of the trough being substantially greater than the radius of the storage structure, a partial cover for the trough substantially flush with the floor and proceeding inwardly from the periphery of the floor toward the center thereof, said cover defining with the upper edges of the sides and inner end of said trough an elongate rectangular opening in the floor having its longitudinal mid-point substantially at the center of said storage structure, a pair of parallel but laterally spaced discharge augers located within and extending substantially the full length of said trough, a pedestal member extending upwardly from the bottom of said trough at the center of the storage structure between said discharge augers, a sweep auger pivoted at one end to said pedestal and extending outwardly therefrom above the plane of the floor, said pedestal being elongated in the direction parallel with said discharge augers and tapering in width in opposite directions from the center thereof, and flow dividers extending lengthwise in said trough between said discharge augers on the opposite sides of said pedestal, said flow dividers combining upwardly converging surfaces between the sections of the discharge augers exposed in said opening.

9. A bottom unloader apparatus as in claim 8 wherein the auger pitch on said discharge augers is greater on that side of the pedestal toward the discharge end of the trough than on the other side.

10. A bottom unloader apparatus for a circular storage structure having a floor, said apparatus comprising a central sump in said floor, a stationary pedestal located centrally of said sump and extending upwardly therein, said pedestal having a central vertical opening therethrough, a gear housing swivelly supported on and by said pedestal, said housing having a bottom power input shaft extending through said opening and a horizontal power output shaft, a sweep auger connected with said output shaft and extending outwardly in said storage structure above the floor, a torque member connected with said gear housing and extending downwardly through the opening in said pedestal, drive means for applying a torque to said member, and means drivingly connected with said input shaft whereby to rotate same and thereby turn the sweep auger on its own axis.

11. A bottom unloader apparatus for a circular storage structure having a floor, said apparatus comprising a central sump in the floor, a sweep auger structure including an auger end support means mounted in said sump and a sweep auger extending outwardly therefrom above the floor, a motor on the outside of said storage structure, a shaft extending into said storage structure beneath the floor level and having one end near said motor and the other end beneath said sump, means drivingly connecting said other end of said shaft with said auger end support means whereby to turn said support means about a vertical axis in response to rotation of said shaft, a one-way clutch mechanism at said one end of said shaft including a driven element and a driving element, an arm extending from the driving element, an eccentric crank driven by the motor, and means connecting said crank with said arm, said means including a resiliently biased lost motion connection operable to permit continued rotation of said crank whenever the resistance to turning of the shaft exceeds the resilient bias in said lost motion connection.

12. A bottom unloader apparatus as in claim 11 including means associated with said one-way clutch mechanism and engageable to permit turning of said shaft in one direction only.

13. A bottom unloader apparatus as in claim 11 including discharge auger means located within said sump and extending outwardly toward said loader beneath said floor, and means drivingly connecting said motor with said discharge auger means.

References Cited by the Examiner

UNITED STATES PATENTS

| | | | |
|---|---|---|---|
| 2,914,198 | 11/1959 | Hein | 214—17 |
| 3,088,606 | 5/1963 | Schaefer | 214—17 |

GERALD M. FORLENZA, *Primary Examiner.*